Patented Aug. 28, 1928.

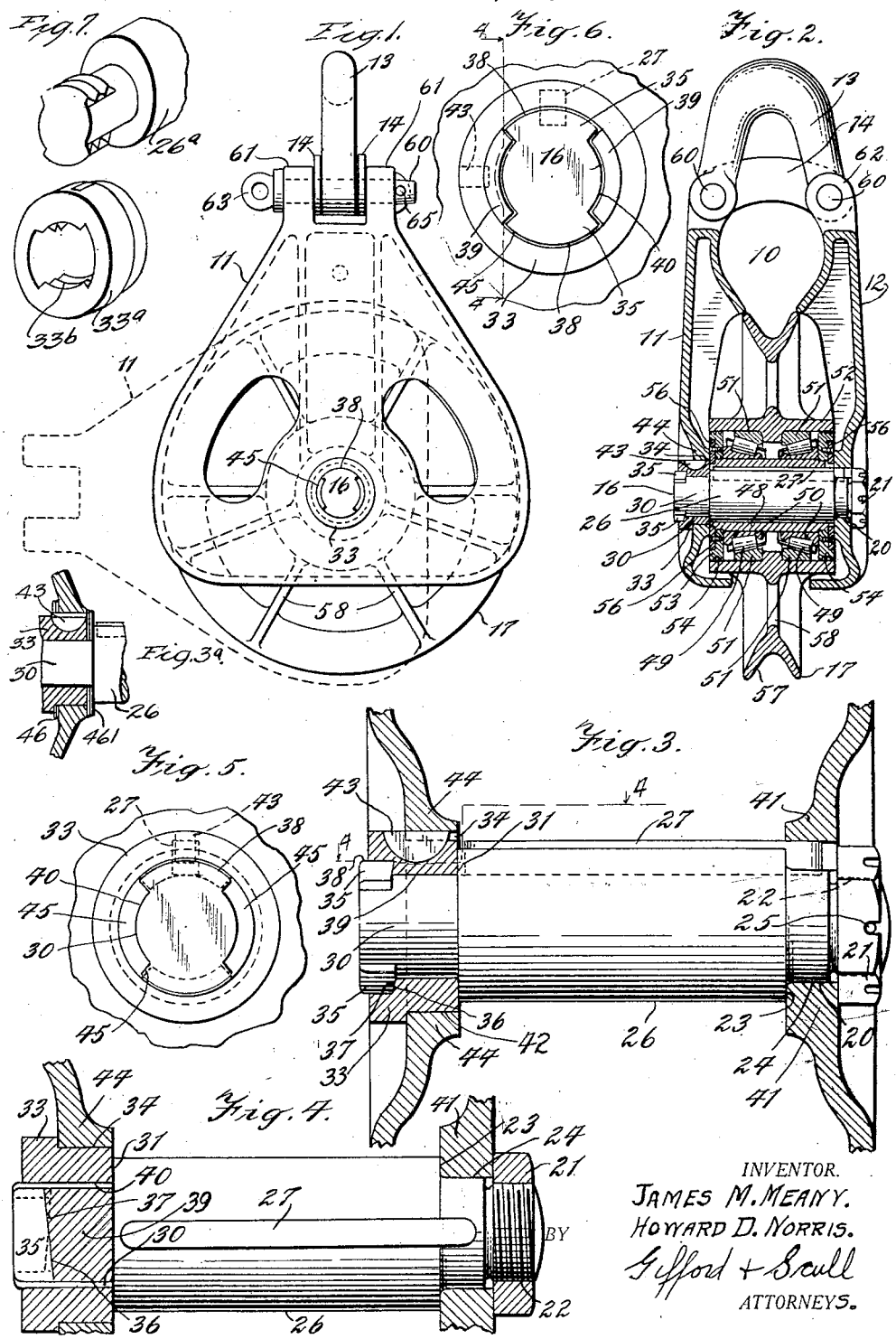

1,681,947

UNITED STATES PATENT OFFICE.

JAMES M. MEANY AND HOWARD D. NORRIS, OF PORTLAND, OREGON, ASSIGNORS TO LIDGERWOOD MANUFACTURING COMPANY, OF NEW YORK, N. Y., A CORPORATION OF NEW YORK.

SHEAVE BLOCK.

Application filed October 12, 1926. Serial No. 141,055.

Our invention relates to sheave structures, more particularly to the kind wherein a ready assembly and convenient disassembly of the parts is provided for, and that without the aid of tools.

One of the objects of our invention is to provide a simple structure in a sheave block, which will be easy to operate and use, and convenient to move from place to place, and is not likely to get out of order. Other and more specific objects will appear from a consideration of the invention set forth.

In the accompanying drawings showing an illustrative embodiment of the invention; Fig. 1 shows an elevation of a heavy duty sheave block showing in dotted lines how one side is rotated through 90°, for assembly or disassembly; Fig. 2 is a cross section on the center line of Fig. 1; Fig. 3 is a fragmentary elevation showing the center pin or main axle with the supporting side plates partly in section; Fig. 3ª is a fragmentary section similar to the left-hand portion of Fig. 4, and illustrating an arrangement by which adjustment between the wedge faces is provided; Fig. 4 is a plan partly in section of Fig. 3, the left hand end being taken along the section lines 4—4 of Figs. 3 and 6; Fig. 5 is a partial end view of Fig. 3 showing the readily detachable fastening means in locked position, Fig. 6 is a view similar to Fig. 5 but illustrating the locking member rotated 90° for withdrawal or assembly, and Fig. 7 is a fragmentary perspective view illustrating a modification.

Like reference characters indicate like parts throughout the drawings.

A sheave block 10 comprises the independent side plates or frames 11 and 12 of any suitable construction such as the hollow castings shown. These sides are retained in operative relation at their upper ends by a shackle 13 and by the associated cross bars 14. A main center pin or axle 16 is permanently or rigidly attached to the side 12 and detachably secured to the side 11. These parts, the shackle 13 and the pin 16 furnish a simple and satisfactory securing means for the block assembly, with the main pin rotatably supporting the sheave wheel 17.

The main pin 16 of the block 10 is rigidly secured through a perforation 20 in the side 12. A nut 21 on a reduced threaded section 22 of the pin co-operates with an opposed shoulder 23 to hold the intervening reduced neck 24 rigidly in the opening 20 of the side 12. This nut is indicated as fastened to the threaded section 22 by a pin 25 in a perforation through the nut and through section 22. Any other suitable means may be used for fastening the nut 21 to the section 22. A cylindrical portion 26 of the axle extends across the space between the two side frames to furnish the bearing supporting the journal or roller bearing carrying the sheave wheel 17. The bearing surface of the main pin or axle 16 is slotted and receives a key 27 which also engages a similar slot in the center part or journal box portion of the roller bearing carrying the sheave wheel 17, as will be noted later.

The opposite end of the axle has a reduced, cylindrical portion 30 forming a shoulder 31. This cylindrical portion 30 is mounted in and carried by the side frame 11. The shoulder 31 of the axle bears against the face of member 33 which is rigidly mounted in a hole 34 in the side frame 11. A pair of oppositely disposed lugs 35 are formed on the end of the main pin or axle 16 to lock over a portion or portions of the outer face of the member 33. These lugs 35 are provided on their inner faces with helical or wedge faces 36 which engage on or bear against complementary, outwardly disposed, helical surfaces 37 on the member 33, to have a wedging or cam effect.

These lugs 35, may, if desired, be screw threaded as at 38ª on their exterior cylindrical surfaces 38, to form the effect of a mutilated bolt as illustrated in Fig. 7. The member 33ª will then have complementary screw threads as at 33ᵇ formed on the interior surfaces of the lands of the projection 39 extending into the perforation or bore 40 in the nut.

As would be apparent the pin 16 may be formed as a unit with, or integral with the reinforced portion 41 of its supporting side 12. This may be done by brazing or welding together the two parts. Or the connection between the pin or axle 16 and the side 12 may have a construction similar to the removable fastening, disclosed connecting the opposite end of the axle 16 and its adjacent side 11. That is, each end of the pin 16 may be wedgingly and removably retained in each one of the side frames 11 and 12 instead of in only one, as shown.

The lugs 35 need not have the wedge shaped surfaces 36 but may function well enough by movement against the wedge surfaces 37 formed on the member 33 or on similar surfaces formed on the outer face of the side frame 11 if no such member is used. Or similarly the wedge, cam or sloped surfaces on the member 33 or on the side frame 11 could be dispensed with, and the wedging effect secured solely by the wedge surfaces 36 on the lugs 35, acting against projections formed on the side frame 11 or on the inserted member.

The member 33 need not be employed but a perforation outlined similarly to the end of the axle 16 and its lugs 35 may be formed in or through the main frame itself. This structure then would consist of a perforation or a hole with projections extending radially into it and provided with such sloped or wedge shaped surfaces as would be capable of performing a wedging function. However, the use of such a movable member 33 in the side 11 and the use of a removable axle permits of easy replacement in the event these parts become worn.

The construction shown is preferable, further, in that a larger cylindrical surface is made available on the reduced portion 30 of the axle by lengthening this portion 30. This decreases the bearing pressure between the portion 30 and the member 33. The member 33 has in turn a bearing area of larger diameter in the outer hole 34 in the side 11 than it gives to the cylinder 30 carried in its central face of smaller diameter. Not so great a length is needed, therefore, on the outer face to secure the same reduced bearing pressure per unit of area between these larger contacting areas. The use of the member 33 to step down the unit bearing pressures between the axle and the side frame 11 is advantageous, therefore.

The member 33 is preferably of cylindrical outline and is provided with a cylindrical neck portion 42 fitting within the hole 34 of the side 11. A key 43 cooperates between the member 33 and a reinforced section 44 of the side 11, to prevent rotation of the inserted member. The member 33 has opposed slots 45 communicating with or forming part of its central bore 40 and passing longitudinally through the center of the member 33.

Adjustable washers 46 may be used, if desired, between the outer face of the side frame 11 and the inner portion of the flange on the member 33. When washers 46 are used, washers 461 preferably having the same aggregate thickness as the washers 46 are preferably interposed between the shoulder 31 on the axle and the inner end of the member 33. These washers provide a take up or adjustment to allow for wear between the contacting wedge faces 36 and 37 to maintain a tight fit for the working parts.

The sheave wheel 17 may be of any desired construction or be provided with a rim of any desired cross sectional outline. The wheel is mounted on a roller bearing of any well known type, the interior of the same being sealed against the entry of dirt and water. The central cylindrical portion 48 of the bearing is keyed to the main pin, as previously noted, and carries rollers 49 mounted in oppositely inclined grooves in the inner bearing runways 50. The outer bearing runways 51 support the hub 52 of the sheave wheel 17. Side plates or collars 53 are threaded on to the center portion 48 to retain the inner bearing runways 50 in position and insure a good running fit of the rollers 49. The ordinary provisions for wear and for lubrication may be provided in any well known manner, such as the grease grooves 54 in the periphery of the collars 53. Keeper or wear plates 56 of suitable material, are each removably fastened by a screw to the side surfaces abutting the side frames 11 and 12. The wheel proper has the rope guide 57 carried on suitable spokes 58.

The shackle 13 and the cross bars 14 are removably secured to the side frames by a pin 60 passing through the spaced ears 61 of the side 11 and by a pin 60 through ears 62 of the side 12. These pins are machined or fitted pins with a ring 63 on one end, for a handle, and to secure a retaining chain. This chain serves to attach the pin 60 to an adjacent side frame through a ring, not shown, which may be placed adjacent to the center of the frame. A cotter 65 or similar fastening means passes through a hole on the end opposite the ring 63 to prevent unintentional movement of the pin. A chain secures the cotter to the same ring or similar attaching means on the side frame to avoid loss of the cotter.

In the case of a light weight block the shackle will be permanently secured to the ears 62 of the side 12 by means of a rivet or headed rod, and be detachable from only the one side 11 or vice versa. However, if the shackle is very heavy it is preferably that both ends thereof be temporarily pinned that it may be readily removale from both side frames to render the parts of the block more readily portable.

The block is assembled by placing the wheel with its roller bearing unit fitting over the key of the main pin or axle 16. The key 27 on the axle fits into the key way or slot in the inner shell 48 of the roller bearing so that the sheave will now rotate relatively to the side 12 and on its rollers only. The side 11 is now brought against the axle 16 in a position with the side 12 such as is shown in the dotted lines of Fig. 1. The lugs 35 on the axle 16 are passed through the complementary slots 45 of the member 33 until the member rests against the shoulder 31 of the axle. A 90° upward rotation of the side 11 swings the two side frames into a position such that the shackle may be inserted. At the same time the helical or wedging surfaces 36 and 37 tighten the sides toward one another to form a stiff or rigid unit. The rope may be looped in to rest in the rope guide 57 or be threaded in later as desired. The shackle is placed in position between the ears on the side frames. Insertion of the pin 60 through the ears of the side frame 11 and the interpositioned shackle end, and the repetition of the same operation for the side frame 12 completes the assembly. The rope may now be threaded in if it was not looped in prior to the insertion and pinning of the shackle with its associated cross bars.

Sheave blocks of the character included in our invention when used on logging operations, must be handled by men and carried through woods, underbrush and over fallen timber. The block as a whole is now far too heavy for a man to carry and it is therefore necessary to disassemble the block into several parts, such as a man can carry. When the block reaches its destination, it must, of course, be assembled before it is used. Blocks have heretofore been used which were disassembled by the use of a heavy wrench which unscrews a main nut threaded onto a main pin passing through both sides of the pulley. In accordance with our invention, the block is readily assembled or disassembled by merely rotating one of the side plates or frames relative to the other side plate and its attached axle member and without the use of any tool whatever.

We claim:

1. In a sheave block, side frames, an axle member secured to one of said frames and provided at its free end with lugs, the other side frame being provided with lugs cooperating with those of the axle and also provided with an opening through which the lugs of said axle are received, the engaging faces of the lugs of said axle and those of the side frame comprising cams whereby the side frames may be assembled and disassembled by rotation of one side frame through a small angle and whereby the parts may be wedgingly held in position.

2. In combination in a sheave block, side frames, an axle member connecting said frames and secured adjacent one of its ends, to one of them, opposed lugs on the other end of said axle, cam surfaces on the interior faces of said lugs, similar surfaces on the second side frame and bearing against the complementary surfaces on the lugs whereby rotational movement of one frame relative to the other will tighten or loosen said bearing contact.

3. In a sheave block, two side frames, an axle member secured to one of said frames, a perforation in said other frame, projections adjacent said perforation, a reduced portion on said axle passing through and supported in said perforation, lugs on said reduced portion having cam surfaces bearing wedgingly against the projections on said other frame, perforations communicating with said first perforation at positions intermediate of the lugs to permit removal of said other frame by rotation of said second named frame with its perforations into registry with said lugs.

4. In a sheave block, two side frames, an axle member secured to one of said frames, a perforation in said other frame, projections on said frame adjacent said perforation, cam surfaces outwardly positioned on said projections, a reduced portion on said axle, passing through and supported in said perforation, lugs on said reduced portion and bearing wedgingly against the cam faced projections, perforations communicating with said first perforation at positions intermediate of the lugs, to permit removal of said other frame by rotation of said second named frame with its perforations into registry with said lugs.

5. In a sheave block, including two side frames, a perforation in each frame, an axle member secured adjacent one of its ends, through a perforation in one of the frames, a reduced portion forming a shoulder on the other end of said axle, said reduced portion fitting in the perforation in the other frame, lugs on said reduced portion at the end of the axle, cam surfaces co-operating between said lugs and the second frame to wedgingly fasten the frame to the shoulder on the axle, perforations through said second frame communicating with the perforation carrying the axle and at an angle with the lugs whereby rotation of said side frame permits said perforations to come into registry with said lugs to permit withdrawal of said frame from the axle, a sheave wheel removably mounted on said main axle and a shackle removably fastening the frames together.

6. A sheave block, including two side frames, perforations in each frame, an axle member secured adjacent one of its ends, through a perforation in one of the frames, a reduced portion forming a shoulder on the other end of said axle, said reduced portion fitting in the perforation in the other frame, lugs on said reduced portion, at the end of the axle, means cooperating between said lugs and the second frame to wedgingly fasten the frame to the shoulder on the axle, perforations through said second frame communicating with the perforation carrying the axle and at an angle with the lugs, whereby rotation of said side frame permits said perforations to come into registry with said lugs to permit withdrawal of said side frame from the axle, a sheave wheel removably mounted on said main axle and a shackle removably fastening the frames together.

7. Means for fastening together the side frames of a sheave block said means being adapted to provide for ready replacement thereof in the case of wear, including an axle to be rigidly fastened at one end to a frame, and a hollow member to be secured in a perforation in the opposite frame, said axle having a bearing section to fit within the member, oppositely disposed lugs adjacent the outer end of said bearing section, and wedging surfaces on said lugs, said hollow member having slots to permit the lugs to pass into said member and surfaces extending into and between said slots to engage the wedging surfaces of said lugs on rotation of said member and its supporting frame whereby the said frames may be clamped toward one another.

8. In combination, in a sheave block, side frames, an axle member connecting said frames and secured adjacent one of its ends to one of them, opposed lugs on the other end of said axle, cam surfaces on the interior faces of said lugs, similar surfaces on the second side frame and bearing against the complementary surfaces on the lugs whereby rotational movement of one frame relative to the other will tighten or loosen said bearing contact, and means to prevent said movement.

9. In combination, in a sheave block, side frames an axle member connecting said frames and secured adjacent one of its ends to one of them, opposed lugs on the other end of said axle, cam surfaces on the interior faces of said lugs, similar surfaces on the second side frame and bearing against the complementary surfaces on the lugs whereby rotational movement of one frame relative to the other will tighten or loosen said bearing contact and a shackle to support said block and secured to said side frames to prevent said movement.

10. In combination, in a sheave block, two side frames, a wheel carrying axle spacing said frames and secured to one of them, lugs on said axle wedgingly engaging similar lugs on the other frame and releasable therefrom on rotation of said other frame and means to prevent relative rotation of said frames.

11. In combination, in a sheave block, two side frames, a wheel carrying axle spacing said frames and secured to one of them, lugs on said axle wedgingly engaging similar lugs on the other frame and releasable therefrom on rotation of said other frame and a shackle to support said block, said shackle being secured to each frame and adapted to prevent rotation of said side frames.

12. In combination, in a sheave block, side frames, an axle member connecting said frames and removably secured adjacent one of its ends to one of said frames, lugs extending from the sides at the other end of said axle, helical cam surfaces on said lugs, similar surfaces on the second side frame and engaging against the complementary surfaces on the lugs, whereby relative rotational movement of the side frames will tighten or loosen said engagement.

13. A side frame for a sheave block, said side frame having a perforation for an axle, a hollow member fitting in said perforation to provide a journal box to support said axle member, an outstanding flange on the hollow member and adjustable washers between the face of the side frame and the flange on the hollow member whereby the flange of the hollow member may be adjusted relatively to the face of the side frame.

14. A side frame for a sheave block, said side frame having a perforation for an axle, a hollow member fitting in said perforation to provide a journal box to support said axle member, and interrupted screw thread securing means extending into the journal box from sides thereof to engage said axle.

15. In combination, a side frame for a sheave block, with an axle entering therein, said axle having lugs extending from its outer face and interrupted screw thread securing means thereon, said side frame having corresponding portions provided with screw thread surfaces engaging said interrupted screw thread surfaces on said lugs, said extensions and lugs being disengageable by the relative rotation of said frame and axle, to permit separation of these parts.

JAMES M. MEANY.
HOWARD D. NORRIS.